United States Patent [19]

Heep

[11] 4,389,949
[45] Jun. 28, 1983

[54] METHOD OF AND ARRANGEMENT FOR SUPPLYING A FUEL TO A PLURALITY OF BURNERS OF A FURNACE

[75] Inventor: Dieter Heep, Bergatreute, Fed. Rep. of Germany

[73] Assignee: Waeschle Machinenfabrik GmbH, Ravensburg, Fed. Rep. of Germany

[21] Appl. No.: 315,995

[22] Filed: Oct. 28, 1981

[30] Foreign Application Priority Data

Nov. 12, 1980 [DE]  Fed. Rep. of Germany ....... 3042661

[51] Int. Cl.³ .............................................. F23K 3/02
[52] U.S. Cl. ...................... 110/101 CF; 110/101 CB; 110/101 CC; 110/106; 110/186
[58] Field of Search ........... 110/106 R, 101 C, 101 R, 110/101 CF, 101 CB, 101 CC, 186, 187, 191, 261, 263

[56] References Cited

U.S. PATENT DOCUMENTS

| | | | |
|---|---|---|---|
| 3,092,337 | 6/1963 | Patterson | 110/106 |
| 3,587,487 | 6/1971 | Makuch | 110/101 R |
| 4,092,094 | 5/1978 | Lingl, Jr. | 110/106 |
| 4,173,188 | 11/1979 | Pearce | 110/106 |
| 4,250,816 | 2/1981 | Angerine et al. | 110/101 CF |
| 4,310,299 | 1/1982 | Binasik et al. | 110/106 |
| 4,313,386 | 2/1982 | Boldt et al. | 110/106 |
| 4,335,683 | 6/1982 | Griswell et al. | 110/101 CF |

*Primary Examiner*—Henry C. Yuen
*Attorney, Agent, or Firm*—Michael J. Striker

[57] ABSTRACT

Supplying a fuel to a plurality of burners of a heating installation is performed by individually dosing a fuel by dosing elements to a plurality of burners with an excessive available amount of the fuel, withdrawing an unused amount of the fuel from the dosing elements, determining a difference between the available amount and the unused amount of the fuel to obtain an actual consumed amount of the fuel, comparing the thus obtained actual consumed amount of the fuel with the desired consumption amount of the fuel, and controlling the dosing of the fuel to each of the burner in dependence upon the results of the comparing steps.

20 Claims, 3 Drawing Figures

METHOD OF AND ARRANGEMENT FOR SUPPLYING A FUEL TO A PLURALITY OF BURNERS OF A FURNACE

BACKGROUND OF THE INVENTION

The present invention relates to a method of and an arrangement for supplying a granular or pulverized fuel to several burners of a furnace.

In certain industrial furnaces provided with several burners, such as for example a double regeneration furnace for burning lime, it is necessary from process technology considerations to retain constant the amount of fuel burner per time unit and thereby the heat balance of the furnace. This was possible only in the condition of operation of the furnace with gaseous and liquid fuels. In contrast, the utilization of granular and pulverized fuels, particularly pulverized coal, failed despite the price advantages as compared with heating gas or heating oil because of the insufficient dosing accuracy, and despite the fact that generally it is known to supply the burner of a furnace with granular or pulverized fuel. The fuel is discharged from a supply container with the aid of a discharge element and pneumatically supplied via a supply conduit to collectors provided for each burner, whereupon the fuel is discharged from the collector via a dosing element to the pressure supply conduit of a respective burner. The quantity of burned fuel can change in dependence upon the discharge output of the dosing elements, for example upon change of the number of revolutions of a cellular wheel sluice or a dosing screw. The required control signal can be supplied to a differential scale on which the collector is mounted, and its weight reduction per unit time can be determined and compared with an actual value.

For the application in the above mentioned field, the above described arrangement is not suitable because, in addition to the fact that the introduction of differential scales for each collector and each burner is very expensive, the unavoidable dosing errors of the individual dosing elements add to an entire error which considerably exceeds the allowable deviation of the consumed fuel quantity per time unit from the predetermined fuel quantity.

SUMMARY OF THE INVENTION

Accordingly, it is an object of the present invention to provide a method of and an arrangement for supplying a fuel to a plurality of burners of a furnace which avoids the disadvantages of the prior art.

More particularly, it is an object of the present invention to provide a method of and an arrangement for supplying a fuel to a plurality of burners of a furnace which makes it possible to supply an oven or a furnace having several burners pneumatically with a bulk fuel in exactly dosed quantities.

In keeping with these objects, and others which will become apparent hereinafter, one feature of the present invention resides, briefly stated, in a method of supplying fuel to a plurality of burners of a furnace in accordance with which a plurality of dosing elements are arranged to individually dose a fuel to a plurality of burners and have an excessive available amount of the fuel, an unused amount of the fuel is withdrawn from the dosing elements, a difference between the available amount and the unused amount of fuel is determined to ascertain the actually consumed amount of fuel, and the thus ascertained actually consumed amount of fuel is compared with a desired consumption value for the fuel, and the dosing of the fuel to individual burners is controlled in dependence upon the results of the comparison.

The arrangement is also provided which includes means for performing the above mentioned steps.

When the method is performed and the arrangement is designed in accordance with the present invention, the fuel supply of an oven or a furnace is constant and is held with a very small deviation from a predetermined fuel consumption value, as well as provided with only one differential scale and one controlling element.

The novel features which are considered characteristic for the invention are set forth in particular in the appended claims. The invention itself, however, both as to the construction thereof and its method of operation, will be best understood from the following description of specific embodiments when read in connection with the accompanying drawing.

DESCRIPTION OF THE PREFERRED EMBODIMENTS

Figure 1:
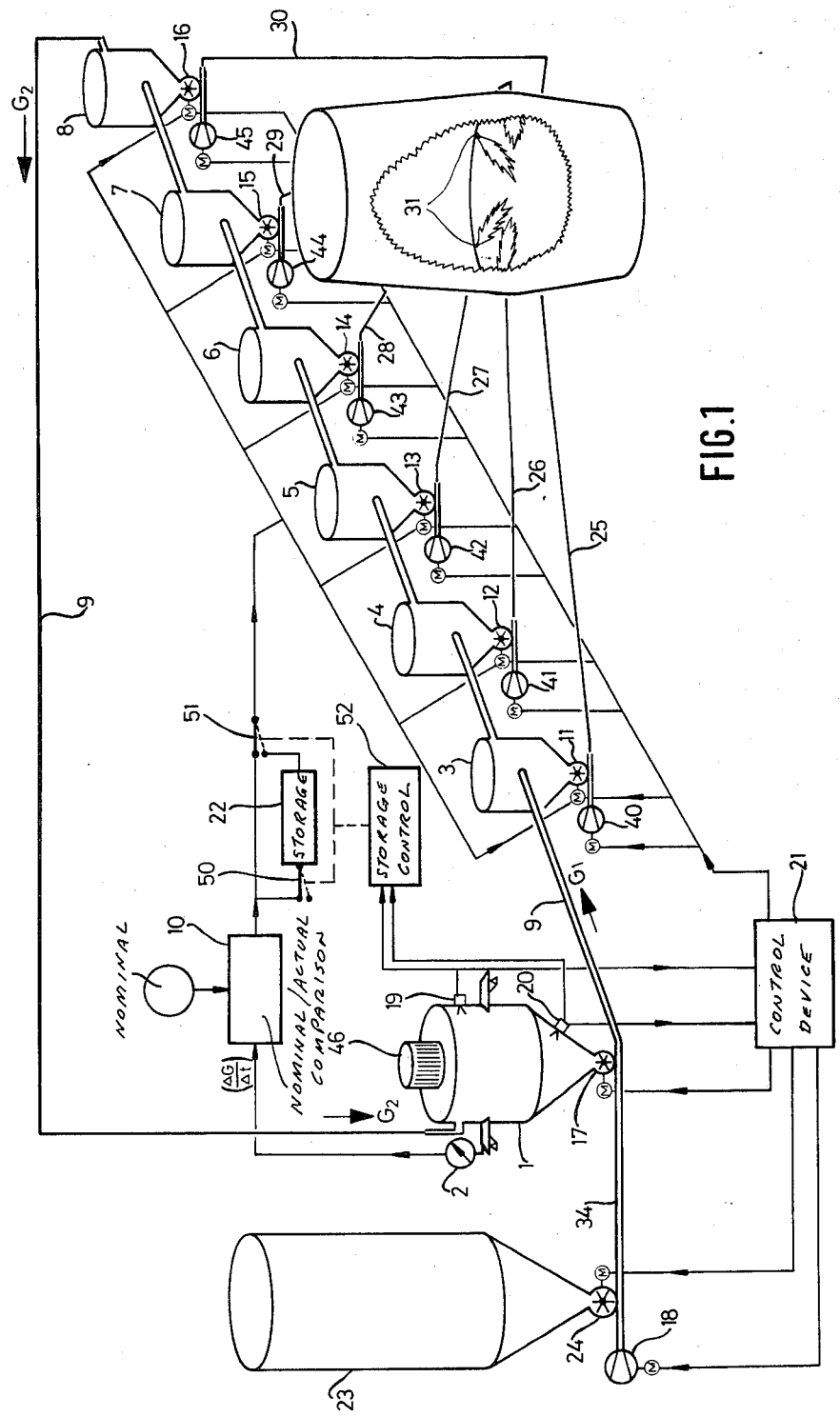
FIG. 1 is a view showing an arrangement for supplying a fuel to a plurality of burners of a heating installation, in accordance with the present invention.

An arrangement for supplying a fuel to a plurality of burners of a heating installation, such as a furnace or an oven, has a supply container 1 arranged on a differential scale 2 and provided at its outlet with a dosing element formed as a cellular wheel sluice, as shown in FIG. 1.

The outlet side of the cellular wheel sluice 17 is connected with a conveying conduit 9 which leads to a plurality of collectors or separators 3, 4, 5, 6, 7 and 8 and then leads from the latter collector 8 back to the supply container 1. Dosing elements 11, 12, 13, 14, 15 and 16 are located under the collectors 3–8, respectively, and also formed as cellular wheel sluices. However, the dosing elements can also be formed as dosing screws. The outlets of the cellular wheel sluices 11–15 are open into pressure conveying conduits 25, 26, 27, 28, 29 and 30 whose other ends are connected with respective burners 31. Blowers 40, 41, 42, 43, 44 and 45 are arranged at the beginning of each of the conveying conduits 25–30. The pressure conveying conduits 25–30 may, however, branch from a common collecting conduit through which the burner air is supplied with the aid of a single blower and the pressure conduits of the burners 31.

The pressure air required for the conveyance in the conduit 9 is generated by a blower 18 via a further conduit 34 which is located below the conveying conduit 9 starting from the dosing element 17. The outlet of a fuel reservoir 23 opens into the conduit 34 with its dosing element 24, which is also formed as a cellular wheel sluice. The fuel reservoir 23 may also be arranged at any other suitable location and connected with the conveying conduit 9, for example with its portion between the dosing element 17 of the supply container 1 and the first collector 3.

The drive of the above mentioned different dosing elements and the blower is identified by reference M. It is connected via electrical conductors with a control device 21 with which an upper level indicator 19 and a lower level indicator 20 of the supply container 1 are also connected.

The differential scales gives its electrical output signal to a control element 10 which, upon comparison with an actual value, produces a control signal supplied via a switch 50 to a control signal storage 22, on the one hand, and via a further switch 51 for driving the dosing elements 11–16 for controlling their dosing or discharging output, on the other hand. The position of the normally closed switches 50 and 51 determines a storage control 52 in dependence upon the signals supplied from both level indicating elements 19 and 20.

The above described arrangement operates in the following manner:

In normal operation, i.e. when the pulverized coal fills the supply container 1, the dosing element 17 continuously supplies the coal into the conveying conduit 9 from which it is conveyed through the pneumatic path into the collector 3 until its filling, then to the collector 4 until its filling, then to the collector 5 until its filling, and so on to the collector 8. The dosing elements 11 and 16 supply the coal from the containers 3–8 in accordance with their adjusted discharge outputs into the pressure conveying conduits 25–30 which lead to the burners 31. The burning air is blown into the pressure supply conduits 25–30 for the further conveyance. The discharge output of the dosing element 17 is selected so that it is higher than the sum of the discharge outputs of the dosing elements 11–16. As a result of this, the collectors 3–8 are always completely filled, and a coal surplus remains after the collector 8. This coal surplus is conveyed back via the conveying conduit 9 into the supply container 1 wherein it is again collected, whereas the conveying air escapes via a filter 46. When the dosing element 17 discharges the weight G1 per unit time of the pulverized coal and simultaneously the weight G2 of the pulverized coal is returned back to the supply container 1 per unit time, the entire rate of the pulverized coal consumed by the burners 31 $\Delta G = G1 - G2$. The signal received from the differential scale is proportional to the weight decrease of the supply container 1 per unit time, and thereby proportional to the entire weight $\Delta G$ of the pulverized coal consumed by the burners 31 per unit time, which determines the actual value. This actual value is compared in the cotrolling element 10 with the predetermined or preadjusted desired value, the control deviation is determined, and a control signal is delivered parallel to the drives of the dosing elements 11–16 with a sign such as to make zero the control deviation. When this process is performed, the sum of the coal consumption of all burners 31, i.e. the actual consumption, is equal to the required consumption with a very small error corresponding to the accuracy of the different scale 2. Thereby, the heat balance of the oven is constant and remains at the predetermined value.

When the level of fuel in the supply container 1 falls below the level determined by the lower level indicating element 20, the latter supplies the signal "Empty" both to the control device 21 and to the storage control 52. The storage control 52 brings the switches 50 and 51 into the position shown in dashed lines. The control signal first supplied in the storage control 52 is retained by the same and supplied unchanged to the drives of the dosing elements 11–16. Simultaneously, the control device 21 deactivates the dosing element 17 and allows the dosing element 24, under the fuel reservoir 23, to operate. The coal discharged from the fuel reservoir 21 is conveyed by the blower 18 via the conduit 14 and the conduit 9 with greater output through the collectors 3–8 so that they are retained in filled condition, and also from the last collector 8 to the supply container 1, until the upper level indicating element 19 generates the signal "Full". This signal is supplied to both the storage control 52 and the control device 21. The control device 21 deactivates the dosing element 24 of the fuel reservoir 23 and allows the operation of the dosing element 17 of the supply container 17, whereas the storage control brings back the switches 50 and 51 into their initial positions to perform the normal operation.

The initial operation of the arrangement in completely empty or empty-running conditions is performed in the same manner, i.e. the fuel reservoir 23 fills first the collectors 3–8 and then the remaining surplus is conveyed to the supply container 1. In this case, however, the discharge output of the dosing elements 11–16 is first adjusted to a predetermined value, inasmuch as no control signal is available.

In contrast to the above described way of filling the supply container 1, supply container 1 can also be filled directly from the fuel reservoir 23.

Figure 2:
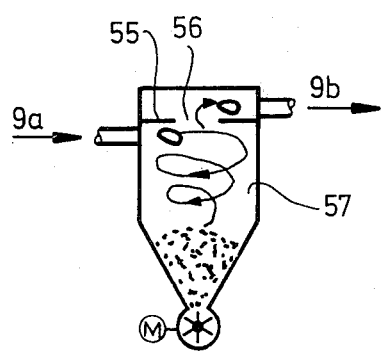
FIG. 2 is a view showing a collector which is utilized in the inventive arrangement.

FIG. 2 shows a particularly suitable embodiment of the collectors 3–8. The collectors 3–8 formed as a cyclone collector or separator in which an incoming conveying conduit port 9a is located deeper than an outgoing conveying conduit port 9b, and a radial partition 55 with a central opening 56 is located between the ports 9a and 9b. In this cyclone separator, the bulk fuel stream from the incoming port flows into the outgoing port first when a space 57 below the incoming port 9a is practically fully filled with the bulk material. The other collectors, which have the same properties, are also suitable for the inventive arrangement. It is also possible to arrange the collectors 3–8 not one behind the other, but parallel to one another on the conveying conduit extending from the supply container 1, as soon as it is taken care that, by locking elements or the like, all collectors are continuously supplied with bulk material or pulverized coal and the surplus quantity is returned to the supply container.

Figure 3:
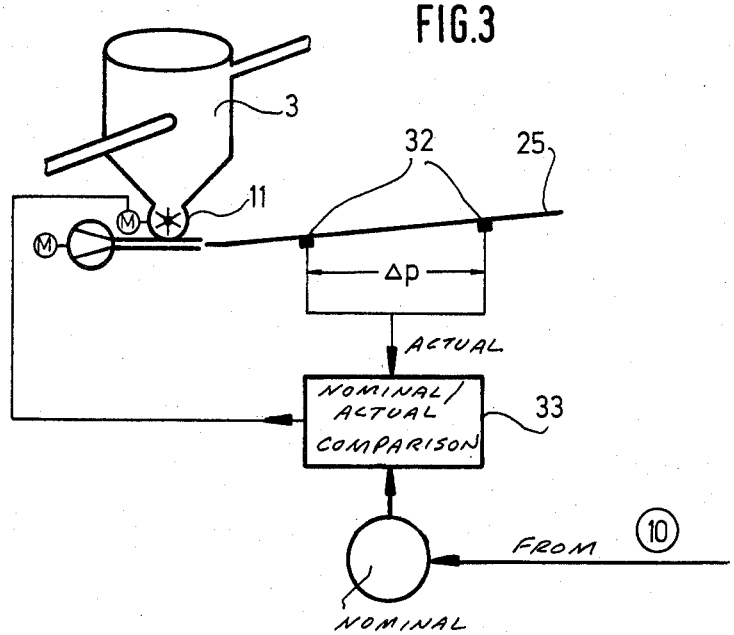
FIG. 3 is a view showing the inventive arrangement in accordance with a further embodiment of the invention.

Normally, it is required in the furnaces of the above described general type to retain constant the entire amount of the coal consumed by the burners per unit time, and not required to supply each individual burner with the same amount as other burners, or at least with a constant amount of fuel. For other applications, however, the latter mentioned conditions can be desirable. This is performed in the construction shown in FIG. 3. In order to provide a constant partial amount of coal supplied to each burner, these partial quantities are also controlled, in addition to the control of the entire quantity, as illustrated in FIG. 3 with respect to the collector 3 and the associated parts. A differential transducer 32 is arranged in the pressure conveying conduit 25 and supplies the actual value of charging of the conveying air with coal to a control element 33. The latter compares the actual value with a desired value for this partial quantity and produces a control signal to the drive of the dosing element 11 in direction toward the reduction of the control deviation. The control signal supplied from the control element 10 shown in FIG. 1 does not act in this embodiment indirectly onto the dosing elements 11–16, but acts as a guiding amount of the desired value of the control element 32 and the similar control element for the other dosing elements.

It will be understood that each of the elements described above, or two or more together, may also find a useful application in other types of constructions differing from the types described above.

While the invention has been illustrated and described as embodied in an arrangement for supplying fuel to a plurality of burners of a heating installation such as a furnace, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of supplying a fuel to a plurality of burners of a heating installation, comprising the steps of providing a plurality of dosing elements arranged to individually dose a fuel to a plurality of burners and having an excessive available amount of the fuel; withdrawing from the dosing elements an unused amount of the fuel; determining a difference between the available amount and the nonused amount of the fuel to obtain an actual consumed amount of the fuel; comparing the thus obtained actual consumed amount of the fuel with a desired consumption amount of the fuel; and controlling the dosing of the fuel to each of the burners in dependence upon the results of said comparing step.

2. A method as defined in claim 1; and further comprising the step of supplying the fuel to the dosing element from a supply element, said withdrawing step including conveying the fuel back into the supplying element, and said determining step including performing the same by weighing.

3. A method as defined in claim 1, wherein said controlling step includes controlling the dosing of the fuel jointly and simultaneously for all the dosing elements.

4. A method as defined in claim 1; and further comprising the step of pneumatically supplying the fuel to the dosing elements and from the dosing elements to the burners.

5. An arrangement for supplying a fuel to a plurality of burners of a heating installation, comprising a plurality of dosing elements arranged to individually dose a fuel to a plurality of burners and having an excessive available amount of the fuel; means for withdrawing from said dosing elements a nonused amount of the fuel; means for determining a difference between the available amount and the nonused amount of the fuel to obtain an actual consumed amount of the fuel; and means for comparing the thus obtained actual consumed amount of the fuel with a desired consumption amount of the fuel and controlling the dosing of the fuel to each of the burners in dependence upon said comparison.

6. An arrangement as defined in claim 5; and further comprising a supply container having a discharge element, and a plurality of collectors connected with said discharge element of said supply container and each communicating with a respective one of the burners via a respective one of said dosing elements, said dosing elements having discharge outputs controlled by said controlling means.

7. An arrangement as defined in claim 6, wherein said withdrawing means is arranged to withdraw the non-used amount of the fuel back to said supply container, said determining means being formed as a differential scale associated with said supply container.

8. An arrangement as defined in claim 1; and further comprising a supply conduit extending from said supply container, said collectors being arranged one after the other along said supply conduit and communicating therewith, said withdrawing means being arranged to withdraw the nonused amount of the fuel from the collector which is farthest from said supply container and to return the same back into said container.

9. An arrangement as defined in claim 8; and further comprising a plurality of partial conduits each communicating one of said collectors with a respective one of the burners, each of said collectors being openable into a respective one of said partial conduit upon complete filling of the former with the fuel.

10. An arrangement as defined in claim 7, wherein said differential scale is arranged to determine a reduction of weight of the fuel in said supply container per unit time, corresponding to the actual consumed amount of the fuel.

11. An arrangement as defined in claim 10, wherein said comparing and controlling means includes a control element arranged to compare the weight reduction determined by said differential scales with a desired value of weight reduction defining the desired consumption amount of the fuel so as to obtain a deviation, said control element being also arranged to control the discharge output of all said dosing element in direction of reducing the thus obtained deviation.

12. An arrangement as defined in claim 9, wherein said discharge element of said supply container has a discharge output exceeding the sum of the discharge outputs of all said collectors.

13. An arrangement as defined in claim 5, wherein said dosing elements are formed as cellular wheel sluices.

14. An arrangement as defined in claim 6, wherein each of said collectors is formed as a cyclone collector having an axis, an outlet, an inlet located deeper than said outlet, and radial partition extending between said inlet and outlet and provided with a central opening.

15. An arrangement as defined in claim 6; and further comprising pressure generating means located upstream of said discharge element of said supply container and arranged to provide such a supply pressure in said supply conduit and said collectors including said farthest collector, which exceeds a pressure at an outer side of said dosing element.

16. An arrangement as defined in claim 15, wherein said pressure generating means includes a blower element.

17. An arrangement as defined in claim 6, wherein said supply container has an upper level measuring element and a lower level measuring element; and further comprising means for filling said supply container with the fuel, and filling control means arranged to receive signals from said level measuring elements and to actuate said filling means to fill said supply container.

18. An arrangement as defined in claim 17, wherein said comparing and controlling means includes a control element and a control signal storing element which is connected with said control element and arranged so that during the filling of said supply container said control signal storing element supplies a control signal to said dosing elements in correspondence with a last control position prior to the filling of said supply container.

19. An arrangement as defined in claim 17; and further comprising a supply conduit extending from said supply container and communicating with said collectors, said filling means including a fuel reservoir provided with a fuel discharge element and arranged to fill said supply container and said supply conduit.

20. An arrangement as defined in claim 5, wherein said comparing and controlling means includes a control element; and further comprising a plurality of pressure supply conduits communicating each of said dosing elements with a respective one of the burners, a differential pressure transducer provided in each of said pressure supply conduits and generating an output signal defining an actual consumed amount of the fuel by a respective one of the burners, and a burner controlling member arranged to further compare said output signal defining the actual consumed amount of the fuel by the respective burner with a desired consumption amount and to receive a signal from said control element of said comparing and controlling means as a command signal, said burner controlling member being also arranged to control the dosing of the fuel to the respective burner in dependence upon said further comparison.

* * * * *